United States Patent [19]

Hochuli

[11] 3,777,281
[45] Dec. 4, 1973

[54] SEAL AND METHOD OF MAKING SAME

[76] Inventor: Urs E. Hochuli, 7011 Southwork Ter., Hyattsville, Md.

[22] Filed: Aug. 3, 1970

[21] Appl. No.: 60,401

[52] U.S. Cl. ................................. 331/94.5, 29/489
[51] Int. Cl. ............................................. H01s 3/02
[58] Field of Search .................. 313/220; 220/2.1 R; 174/50.61, 50.63, 50.64, 52.55; 29/489; 331/94.5

[56] References Cited
UNITED STATES PATENTS

| 2,798,577 | 7/1957 | LaForge, Jr. | 174/50.61 |
|---|---|---|---|
| 3,517,279 | 6/1970 | Ikeda et al. | 317/234 |
| 3,062,981 | 11/1962 | Stoeckert et al. | 174/50.61 |
| 3,464,725 | 9/1969 | Bronnes et al. | 174/50.61 |
| 2,099,531 | 11/1937 | Passarge | 313/331 |
| 3,501,013 | 3/1970 | Madsen | 29/489 |
| 3,029,505 | 4/1962 | Reichenbaum | 29/489 |
| 3,528,028 | 9/1970 | Baird | 331/94.5 |
| 3,566,302 | 2/1971 | Rhodes | 331/94.5 |

Primary Examiner—William L. Sikes
Attorney—Beveridge and DeGrandi

[57] ABSTRACT

Gold films are used as an alloying flux to form 5 micron thick film seals mostly below 300°C. Pyrex was sealed to Quartz, ULE*, Cervit*, Germanium, Gallium Arsenide, (GaAs), invar and copper. The seals can also be used as current feed throughs and as graded seals and are particularly applicable to gas laser devices.

*Trademarks

8 Claims, 4 Drawing Figures

PATENTED DEC 4 1973　　　　　　　　　　　　　　　3,777,281

INVENTOR
URS E. HOCHULI

BY Beveridge & DeGrandi
ATTORNEYS

SEAL AND METHOD OF MAKING SAME

BACKGROUND AND BRIEF DESCRIPTION OF THE INVENTION

The invention disclosed herein is concerned with the sealing and joining of materials with very low thermal expansion coefficients such as Corning Inc., ULE material and Owens-Illinois, Inc. CERVIT material for making ultra stable gas laser devices. However, as will be shown later, it is evident that the sealing method developed covers a far broader range of applications. Such laser structures contain internal mirrors with multilayer dielectric coatings which can be heated to about 400°C for periods of about one hour. This represents a thermal upper limit for the sealing temperature and rules out such processes as gold diffusion seals, the AgCL type seal, and probably the well known Mallory process, unless same can be further tailored. (Higher sealing temperatures are of course possible if the user is willing to cool the mirror areas but the introduction of temperature gradients is not very pratical).

The operating temperature of the Helium-Neon laser (referred to hereinafter as the "He-Ne laser") is usually below 150°C. Reliable seals for periods of time far in excess of $10^4$ hours at the operating temperature of the laser are necessary. For the outgassing (e.g. vacuum bake-out) purposes it would be convenient to work with seals that are bakable to 300°C. The He-Ne laser has mirrors with reflectivities of 99 percent or higher so, for this reason, one cannot tolerate any contamination during the sealing process. He-Ne lasers, using proper cold cathodes, do not need any additional getters. However, the lasers are evacuated to $10^{-8} - 10^{-9}$ Torr before filling with the He-Ne gas mixture takes place. It is apparent that seals of the ultra high vacuum type are required. The most severe requirement for frequency stable laser strucures is a constant mirror separation. Since the seals are part of this distance, extremely thin and stable seals are required.

The present invention while described in terms of its preferred emvironment, namely, the fabrication of ultra stable gas laser structures and devices, is directly broadly to a unique method of making an improved seal or joint, particularly an improved hermetic seal for gas laser devices.

BRIEF DESCRIPTION OF THE DRAWING

The above and other features of the invention will become more apparent from the following specification, taken with the accompanying drawing wherein.

BRIEF DESCRIPTION OF THE INVENTION

Figure 1:
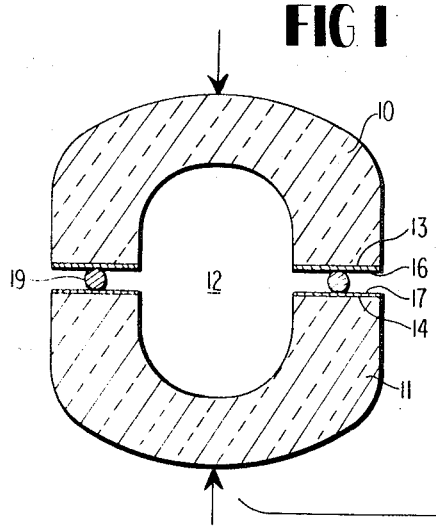
FIGS. 1 and 2 disclose a prior art joining sealing technique and FIGS. 3 and 4 illustrate the invention in its preferred form as applied to making ultra-stable laser structures and devices.
Figure 2:
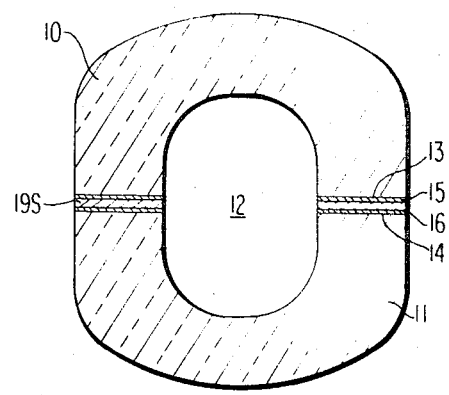

Referring to FIGS. 1 and 2, a pair of cup-shaped, quartz, glass or ceramic members 10 and 11 enclosing space 12, are shown as having prepared mating surfaces or edges 13 and 14, respectively, to which have been applied thin gold films or platings 16 and 17, respectively. While the perimetrical shape may be circular, square or any other shape, for purposes of simplicity, it will be considered as circular. As illustrated, an annular ring on Rib 19 of sealing metal, such as a 0.5mm indium wire metal ring is placed between the gold plated surfaces 16 and 17 and (mild) pressure as indicated by the (arrows) is applied simultaneously with the application of heat to melt the indium rib of ring 19. It will be appreciated that the above procedure may be carried out under a vacuum or in a selected gaseous atmosphere, that the device may be fabricated in air, or a gas filling tubulator, not shown, may be used to vacuum bakeout, the device, and fill same with any desired gas. At any rate the seal of indium metal 19S has a certain finite thickness which can vary with temperature.

Figure 3:
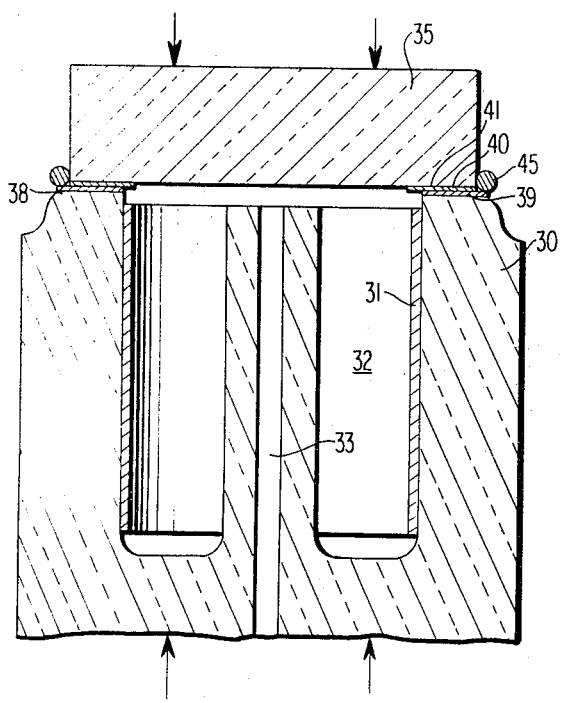
Figure 4:
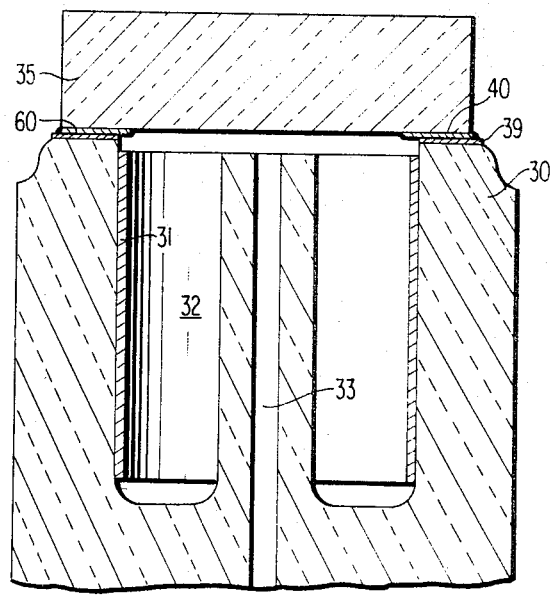

In FIG. 3 there is shown the end portions of a laser body member 30, having an electrode 31 in cavity 32 coaxial with discharge bore 33 and connected thereto by a passage (not shown). A plate 35, having reflective coating thereon (not shown) is positioned for sealing to body member 30. The abutting surfaces 38 on the body member and 39 on the plate member are ground smooth as described above and provided with gold plated surfaces 40 and 41, respectively, as also described. (It will be appreciated that such gold coatings are greatly exaggerated in the drawings for purposes of illustration). As shown in FIG. 3, the gold plated ends are butted tightly and a ring of 0.5mm indium wire 45 is placed on the outside.

The pieces are then heated in a vacuum of $10^{-5}$ Torr or better. (It should be considerably cheaper to use an inert atmosphere for the sealing). It takes about 30 minutes, depending on the size of the pieces, until the indium melts and starts to wet the gold by capillary and in-situ alloy action between the two surfaces. The indium spreads by capillary action as indicated at 60 in the next 10 to 15 minutes as far as 0.8cm from the original wire position. By alloying and capillary action it flows between the pieces to be joined. The gold layer is completely penetrated by the more silvery looking indium and the spreading can be easily seen if the pieces to be joined are transparent.

Preferably, mostly, 99.99 percent pure indium is used. However, the invar to Pyrex seal was made with a 90 percent indium 10 percent silver solder.

SURFACE PREPARATION

The surfaces to be joined are polished with a final polish using 5 micron or finer abrasive compound. Most of the surfaces were finished with Barnsite. The surface flatness is not too critical, a few wavelengths over a distance of 5 cm is sufficient. Both surfaces are then gold coated. The gold coating acts as a wetting agent. For practical purposes the gold paints that are fired-in yield the most economical coatings. These gold paints do have fluxes added and the exact compositions are usually not released for proprietary reasons. However, a large number of gold paints made by Engelhard Co. have been tested and that company's liquid bright gold No. 7336 has so far worked satisfactorily. Any gold film that is satisfactorily wetted by indium is suitable. Then gold paints are fired in air to 540°C for Pyrex, 750°C for ULE, Quartz and CERVIT. Preferably, two gold coatings are used, one on each of the abutting surfaces to be joined or sealed. Gold coatings made over a chromium layer by vacuum deposition also work well, but this is a less convenient and more expensive process.

Platinum and silver paints do not work as well; the indium either does not flow as well or alloys too fast with the layer and curls up in little droplets.

SEAL THICKNESS

The original gold coatings are 0.2 to 0.4 micron thick. Using interferometric methods, the final seal thickness was measured and is in the order of 5 microns.

TENSILE STRENGTH

Under tension the seals break at about 75 kg for seal areas of 0.54cm$^2$. This corresponds to 139 kg/cm$^2$, which is about 4 times the tensile strength of pure indium.

VAPOR PRESSURE

The melting point of indium is around 157°C. The pieces to be sealed are heated to about 250° C during the sealing process but the vapor pressure of indium is still lower than 10$^{-8}$ Torr at 450°C. The vapor pressure of the fired gold coatings is unknown. The concern here is mainly with the vapor pressure of metals, such as bismuth, which are added to the gold paint. Obviously, in the case of laser, materials which may produce harmful contamination on the mirror and cathode surfaces must be avoided.

MATERIALS SEALED

Endplates of Quartz, ULE and Ge to 30mm Pyrex tubing have been joined. A 5mm thick oxygen free copper plate and a 3mm thick copper plated invar plate was joined to similar Pyrex tubes. In these instances, gold layers were used on the Pyrex only. GaAs CO$_2$ laser windows were sealed to Pyrex. Many other materials can be sealed by this process.

STABILITY OF THE SEALS

Although the thermal expansion coefficient of indium is unfortunately higher than desired for use in laser devices, this is substantially reduced by the relatively thin seal of the order of 5 microns.

GRADED SEALS

The seals described allow one to seal Pyrex tubing directly to Quartz and are therefore useful as graded seals.

CURRENT FEED THROUGH

The seals can carry relatively large currents if properly made and can serve as current feed throughs. If this property is not wanted and for eye appeal it is possible to dissolve the gold and indium on the outside in 50 percent HCL and leave just the 5 micron thick film between the joined surfaces.

A NONDESTRUCTIVE SEAL

For experimental purposes it is often convenient to disassemble the seals. This is easily done by heating the seals until the indium melts. The seal can then be taken apart, the parts cleaned in aqua regia and reused again. On materials such as Gallium Arsenide, the gold does alloy and the surface may have to be repolished before it can be reused.

TEMPERATURE CYCLING

To get an indication of the seals' resistance to thermal stresses, a 2.5mm thick Gallium Arsenide, (GaAs) plate was sealed to the end of a 15mm OD, 13mm ID Pyrex tube. Pyrex was purposely chosen for a mismatch of the thermal expansion coefficients. (The ductility and low melting point of indium are definitely advantages for joining materials of different thermal expansion coefficients).

The seal was then heated for 3 weeks at 140°C, cooled to room temperature and then dipped into liquid nitrogen. The heating and cooling cycle from 300° to 77°K was then repeated three more times. During this complete treatment the seal was connected to a vacuum pump that enabled us to see leaks of 10$^{-9}$ cm$^3$ per sec. under STP. No leaks were observed.

HELIUM LEAK TESTS

To be sure that no very small leaks were overlooked, veeco Ms 12 Helium leak detector was used to test eight different seals. The materials joined included 45mm seals between Corning ULE and 9977W material (two seals), 9mm OD Pyrex capillary to ULE (one seal), 30mm Pyrex tubing to a 5mm thick Cu plate (one seal), 30mm Pyrex tubing to a 3mm thick Quartz plate (one seal), 15mm Pyrex tubing to a 2.5mm thick GaAs plate (the mistreated seal described before), 11mm Pyrex tubing to GaAs Brewster angle window (one seal), 30mm Pyrex tubing to a 3mm thick Ge plate. None of the eight seals showed any measurable leaks on the most sensitive scale of about 5.10$^{+12}$ cm$^3$ Helium per sec. under standard temperature and pressure.

What is claimed is:

1. A method of joining two body members, comprising forming a planar surface on each of said body members at the place where they are to be joined, each planar surface being constituted by a metal capable of being wetted by a fusible low melting point metal, placing said surfaces in tight abutting contact with each other, placing a fusible low melting point metal along the line of abutting contact of said two planar surfaces, heating said low melting point metal to its melting point for a sufficient period of time to cause, by capillary force a very thin layer of said metal to appear on and between planar surfaces, such that the tensile strength of said thin layer is greater than its bulk strength, and cooling said metal to solidify same.

2. The method defined in claim 1 wherein said low melting point metal is selected from the group comprising indium, indium-silver, indium-gold alloys.

3. The method defined in claim 1 wherein said low melting point metal is indium and said metal capable of being wetted in gold and each said body member is of another material.

4. The invention defined in claim 3 wherein the thickness of said indium metal between said surfaces is about 5 microns thick.

5. In a gas laser device, a seal made in accordance with the method of claim 4 and wherein the thickness of said indium between said surfaces is about 5 microns thick.

6. A hermetic seal between a pair of body members having a pair of planar, mutually abutting surfaces, each having perimetrical configurations corresponding to that of the seal, comprising a thin layer of substantially pure indium metal alloyed with metal on at least one of said surfaces and about 5 microns thick such that the tensile strength of said thin layer of indium metal is greater than its bulk strength.

7. In a gas laser device having body member with a gas chamber formed therein and a reflective member hermetically sealed to one end of said body member, the hermetic seal defined in claim 6 wherein said body member and said reflective member constitute said members having said abutting surfaces.

8. The invention defined in claim 6 wherein said metal on said at least one surface is gold and the other of said surfaces is a metal selected from the group consisting of gold, copper, silver and platinum.

* * * * *